United States Patent [19]
Mutze

[11] Patent Number: 5,889,554
[45] Date of Patent: Mar. 30, 1999

[54] PROCESS AND SYSTEM FOR GENERATING A FULL COLOR IMAGE OF MULTISPECTRAL IMAGE FROM THE IMAGE DATA OF A CCD IMAGE SENSOR WITH A MOSAIC COLOR FILTER

[75] Inventor: Ulrich Mutze, Stuttgart, Germany

[73] Assignee: Eastman Kodak Company, Rochester, N.Y.

[21] Appl. No.: 735,767

[22] Filed: Oct. 23, 1996

[30] Foreign Application Priority Data

Apr. 25, 1996 [DE] Germany ................. 196 16 440.0

[51] Int. Cl.$^6$ ....................................... H04N 3/14
[52] U.S. Cl. ............................. 348/273; 348/278
[58] Field of Search ......................... 348/272, 273, 348/276, 278, 223, 277; 382/167, 162, 166; 358/515, 513, 514; 257/440

[56] References Cited

U.S. PATENT DOCUMENTS

| | | | |
|---|---|---|---|
| 4,630,105 | 12/1986 | Knop | 348/278 |
| 4,760,441 | 7/1988 | Kohno | 348/278 |
| 5,187,569 | 2/1993 | Tani | 348/277 |
| 5,382,976 | 1/1995 | Hibbard | 348/273 |
| 5,426,290 | 6/1995 | Kawamoto et al. | 257/440 |

*Primary Examiner*—Wendy Garber
*Assistant Examiner*—Luong Nguyen
*Attorney, Agent, or Firm*—David M. Woods

[57] ABSTRACT

Process and system for producing color images and/or multispectral images in which an optical arrangement (3) images a scene on a CCD image sensor (2), said sensor being covered by a mosaic filter with a periodically repeating basic pattern (GM). A following analog/digital converter (5) produces digital signals from all pixels $p_{ij}$ of the CCD image sensor (2). The basic pattern (GM) consists of a minimum of five different filter elements. In addition, an image memory (6) is provided which is divided into image memory levels ($B_0, B_1, \ldots, B_{nF}$). The process comprises the follow steps:

storing of values (wert[i][j][0]) of each individual pixel ($p_{ij}$) of the CCD image sensor (2) in a dedicated level $B_0$ of the image memory (6), said values being determined by the CCD image sensor (2) and converted by a following analog/digital converter (5) into digital values;

determining an "unfocussed image" in the following way: for each color f and for each pixel p the neighboring pixels of color f are measured, their values read from $B_0$ and combined to arrive at a weighted average value;

storing of values (wert[i][j][f]) for all the different filter elements on the CCD image sensor in dedicated image memory levels ($B_1, B_2, \ldots B_{nF}$);

calculating final color values ($C_1, C_2, \ldots, C_{nF}$) by means of additive image sharpening; and storing the final color values ($C_1, C_2, \ldots, C_{nF}$) in dedicated image memory levels ($B_1, B_2, \ldots B_{nF}$).

21 Claims, 5 Drawing Sheets

PROCESS AND SYSTEM FOR GENERATING A FULL COLOR IMAGE OF MULTISPECTRAL IMAGE FROM THE IMAGE DATA OF A CCD IMAGE SENSOR WITH A MOSAIC COLOR FILTER

FIELD OF THE INVENTION

The invention relates to a process for generating a full color image or multispectral image from the image data of a CCD image sensor with a mosaic color filter, said process having an optical arrangement capable of imaging a scene on a CCD image sensor which is covered by a mosaic filter with a periodic basic pattern.

In addition, the invention relates to a system for generating a full color image or a multispectral image from the image data of a CCD image sensor with a mosaic color filter, said system having an optical arrangement for imaging a scene on a CCD image sensor, said CCD image sensor being covered by a mosaic filter with a periodic basic pattern and being provided with an analog/digital converted for delivering digital signals from all pixels of the CCD image sensor.

BACKGROUND OF THE INVENTION

Electronic cameras, equipped with only one matrix image sensor (e.g., a CCD image sensor) for taking images and which nevertheless produce a color image with a single exposure, exist both in the form of video cameras (moving picture) and electronic digital cameras (still image). A mosaic filter (CFA=color filter array) allows such cameras to differentiate between colors. Such a filter is placed directly on the surface of the CCD image sensor while each cell (pixel) of the CCD image sensor is covered by a filter element (pixel filter) having suitably chosen spectral transparency.

The document "The Seybold Report on Publishing Systems"(12 Dec. 1994) discloses a digital camera which can take images with a single exposure of a CCD image sensor. The individual cells of the CCD image sensor are covered by four different filter elements and the filter elements are placed directly on the individual cells of the CCD image sensor. The four filter elements employed for taking an image are red, green, blue and blue-green. The filter elements are arranged on the CCD image sensor in a mathematical pattern. In order to determine the color of each individual pixel of the CCD image sensor, the color values are first determined by an algorithm over an area of 64 pixels and afterwards each pixel is compared with its nearest neighbor. If this is not sufficient to determine the color, then the comparison with the nearest neighbors is extended to a larger area. In transition regions from one color to another, up to one thousand calculations are required for one pixel. Since the data are not available in standard RGB format, a conversion has to be performed which takes a high performance computer approximately 7 minutes per image to complete.

Video camera also exist which have combinations of additive and subtractive filter sets, such as, for example, green, cyan, magenta, yellow or green, white, cyan, yellow (see EP-A-0 570 204). Such combinations are intended to better adjust the spatial scanning frequencies for luminance and chrominance signals to the bandwidths of the video system and hence, a reduction of the color Moire effects. However, such combinations do not achieve, nor are they aimed at improving color fidelity or improving the spectral selectivity of the image. In the video systems discussed in EP-A-0 570 204 the signal processing is performed in "real time" without intermediate storage of images. Thus, the technical set-up is completely different than in the case of digital still image cameras as referred to in the process according to the present invention.

Most electronic color cameras have mosaic filters with three different colors. In almost all electronic cameras these different colors are arranged in rows and columns in a periodically repeating pattern. The pattern created by repetition of a (2,2) matrix with identical diagonal elements is known as a Bayer pattern and is widely used as a mosaic color filter. Highly developed processes for color interpolation in mosaic filters with RGB filters in the Bayer pattern (U.S. Pat. No. 5,373,322 and U.S. Pat. No. 5,382,976) exploit the peculiarities of this pattern in a decisive way, that is, they use the dominance of green and the low incidence of fuzziness in the case of red and blue. In addition, the processes disclosed in U.S. Pat. No. 5,373,322 and U.S. Pat. No. 5,382,976 have been developed in such a way that regardless of the contents of the image, the process is able to decide whether more use should be made of the row-wise or of the column-wise correlations of the image data. This produces texture-like artifacts in those image areas which have no details, but which are noisy.

An electronic camera has to be able to produce image data sets in a conventional format, i.e., TIFF or TARGA. This means that a value has to be provided for each pixel and for each color belonging to the data set. Thus, for each pixel an R-value, a G-value, and a B-value have to be available in the RGB data set. It is evident that the raw data of the camera do not satisfy this requirement: they contain only one color value for each pixel, that is for a color which changes from pixel to pixel. Hence, the camera must have a means by which it can use the raw data to calculate these missing color interpolation of mosaic filters or, in short, a process for color interpolation.

The intention is to arrive at values which would be obtained when taking images without using a mosaic filter at arbitrarily short time intervals with the different filter elements nF and using a filter wheel which contain the nF filter colors as filters covering the overall surface area.

The quality of such a process is a complicated matter. As the lack of object information is at best replaceable by plausible, but never by completely certain assumptions, it is always possible to construct instances of images whose quality would seemingly indicate that the process is a failure. For example, it is easy to see that for each set of raw data there is a distribution of white light which would generate these raw data. On the other hand, there are often plausible reasons why such phenomena need not be taken into consideration. The most noticeable artifacts ("aliasing") occur in the case of images in which the image signal differs greatly from pixel to pixel. In most electronic cameras with relatively few pixels, a "blur filter" ensures that no such finely structured light distributions can occur in the area of the sensor.

Distinctions are made between the following, partly overlapping quality complexes:

1. Faithfulness to detail: the ability to reproduce fine structures which extend only over a few pixels, the reproduction being made without greatly changing the form. When comparing two different systems, improved faithfulness to detail is evidenced by improved legibility of the text, the elements of which only cover a few pixels.
2. Artifacts: these include all image structures of which, without possessing detailed knowledge of the camera, it can be said that they are very probably not the same as the original. Examples are:
a) color edge artifacts: strongly colored striped pattern in the transition area between evenly, but differently colored areas.
b) color Moiré: semi-even, usually striped color variations over periodically structured areas.
c) flat-field artifacts: textures, defects and jumps in intensity along the lines of such image areas which apparently lie outside the focal area of the optical image and which, thus, do not show any sharp differences in intensity.

3. Color fidelity: considered here for monochromatic areas which extend over many pixels and in all directions.

SUMMARY OF THE INVENTION

It is the object of the present invention to avoid the undesired appearance of texture produced by the aforementioned processes while simultaneously maintaining high image sharpness and suppressing color edge defects.

A further object of the present invention is to develop and to realize a process in a system so that further developments are possible such as, for example, the introduction of additional filter colors, without necessitating changes in the hardware and software architecture.

In addition, the process is intended for use in more periodic and pseudo-random distributions of the filters while maintaining similarly favorable results. In particular, the aim is to improve color fidelity and to enable a conversion of the exposure to a type of light with different spectral composition.

In accordance with the present invention this object is attained by means of a process in which a basic pattern is built up of at least five different color filter elements and which comprises the following steps:

storing values of each pixel of the CCD image sensor in a dedicated level of an image memory, said values being measured by the CCD image sensor and being transformed by a following analog/digital converter into digital values;

deriving an "unfocussed image" so that for each color f and for each pixel p, the neighboring pixels of color f are determined, their values read from Bo and combined to yield weighted average values;

storing the values for all the different filter elements on the CCD image sensor in dedicated image memory levels;

calculating the final color values by means of additive image sharpening and storing the final color values in the dedicated image memory levels.

In accordance with the present invention a system is also provided in which the basic pattern is built up of at least five different filter elements.

Advantages of the process and the system as disclosed by the present invention consist in that images can be taken by the CCD image sensor with a single exposure and in that greater color faithfulness is thereby achieved than in the case of an RGB image. The pixels of the CCD image sensor are covered by at least five different filter elements. According to a preferred embodiment of the invention, the so-called mosaic filter consists of a periodic basic pattern.

A particularly advantageous aspect of the present invention is the process implemented in the system. To generate a full color image, values of the individual pixels on the CCD image sensor are stored in an electronic memory. Using these data the pixels are determined which are provided with a filter element of a specific color. The color values of the individual pixels are determined using the corresponding weighting factors of their nearest neighbors. The final color values are determined by means of additive image sharpening.

In addition, the process and its related system make it possible, when taking an image, to convert the values from one illumination situation to another with a different spectral composition.

BRIEF DESCRIPTION OF THE DRAWINGS

The subject matter of the present invention will now be described with reference to an embodiment shown in the drawing wherein.

DETAILED DESCRIPTION OF THE INVENTION

Figure 1:
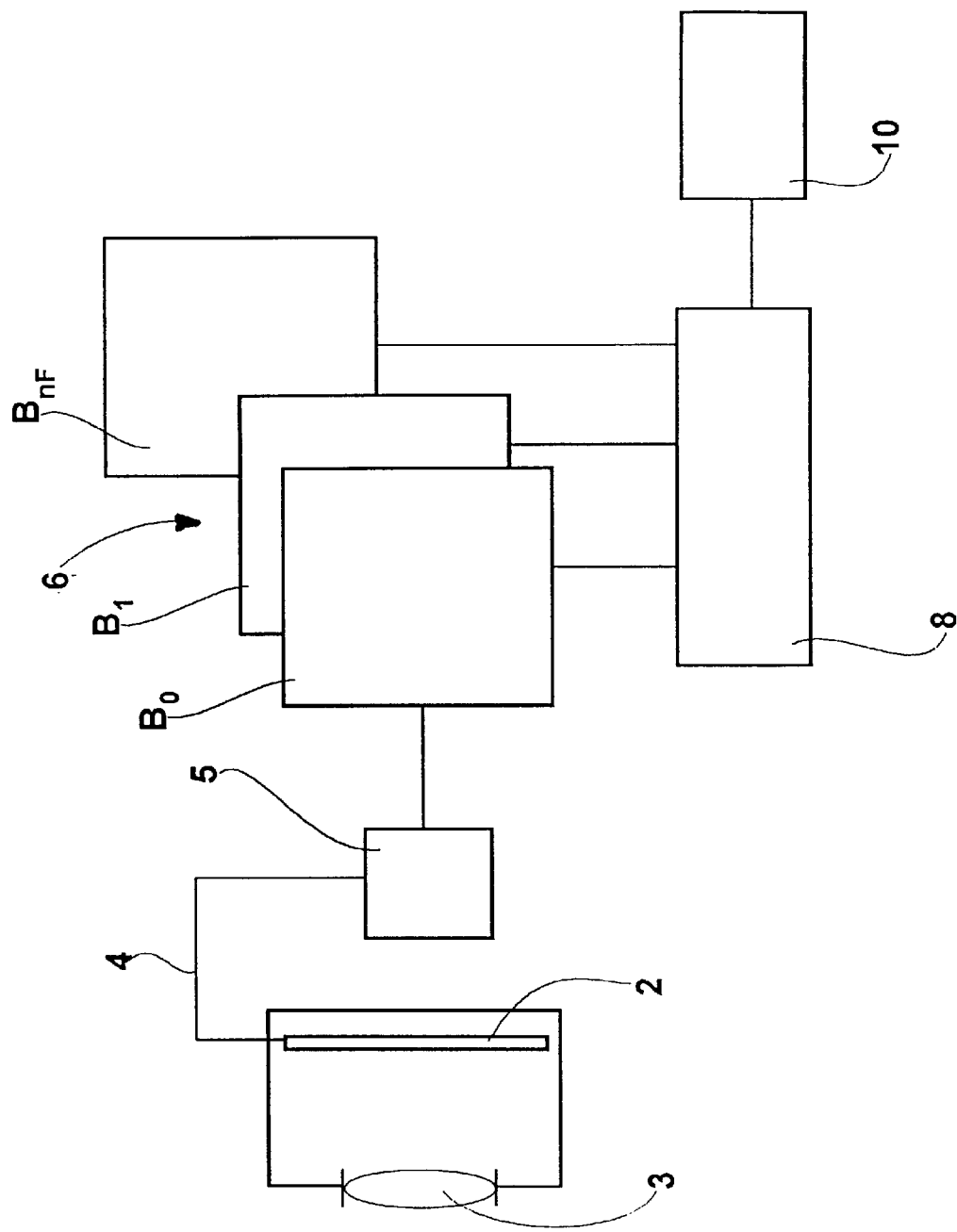
FIG. 1 represents a schematic view of the. system as described in the present invention.

The system according to the present invention, as shown schematically in FIG. 1, comprises an optical arrangement 3 which images a scene or an object on a CCD image sensor 2. The CCD image sensor 2 is divided into several pixels $p_{ij}$, i running from 1 to n and indicating the number of columns on the CCD image sensor 2, and j running from 1 to m and indicating the number of lines on the CCD image sensor 2. The signals gained from the individual cells of the CCD image sensor 2 are conducted via an electrical connection 4 to an analog/digital converter 5. Thereafter, the digital signals are stored in an image memory 6. The image memory 6 is divided into several image memory levels $B_0$, $B_1$ to $B_{nF}$, nF representing the number of different filter elements placed on the CCD image sensor 2. The individual image memory levels $B_0$, $B_1$ to $B_{nF}$ are connected to a processor 8 which processes the data required to generate a full color picture. In addition, processor 8 is connected to an additional electronic device for the processing and storage of signals.

If the number of filter elements with different spectral transparency is increased, then it is possible to achieve an improvement in color fidelity. A CIE ruling with regard to color values for the light incident on the CCD image sensor 2, requires that the spectral sensitivity of the pixels can be represented as a linear combination of the corresponding functions of the CIE standard observer. This demand is very difficult to meet from a technical point of view and is grossly violated in electronic cameras of conventional construction. The result is that no matter how well a system comprising camera and display is calibrated, it will not permit a faithful reproduction of color nuances. To be more precise: there will always be illuminated objects which appear to the observer as being heterochromatic for which, however, an RGB camera can only deliver like signals. Regardless of the method of processing the signals, the color reproduction stays the same: this is in contrast to the observer's visual perception of the original. Naturally, the opposite effect likewise occurs: objects visually perceived as being isochromatic are reproduced as being heterochromatic. If a mosaic filter on a CCD image sensor contains more than three different filters, then new signals can be produced by forming suitable linear combinations of the camera signals: these new signals correspond far more exactly to the visual perception of the original than do the RGB signals. This principle was applied to four filters in the camera model already referred to in the "Seybold Report on Publishing Systems", 12th Edition, December 1994.

In addition, a conversion from one type of illuminating light to another can easily be performed. If it is to be possible to draw a reliable conclusion from the color of an illuminated body to its color when illuminated by light having another spectral composition, than it is necessary to know the spectral properties both of the reflected light as well as of the illuminating light. Using suitable methods of calculation (spectral reconstruction), the spectral properties can be computed if the signals are known which the light yields after passing through filters of known spectral transmission. These computations will be more reliable, the more filter elements there are available for the analysis of the light. Just five suitable filter elements, instead of the usual three or four, will dramatically improve the reliability of this process. It can be used, for example, to take photographs under low-cost halogen light conditions and then to convert to daylight. The spectral composition of the illumination can be determined, without using any other devices, by photographing a white reference body having a known spectral reflection degree under the given illumination or, by always adding this reference body to the scene to be photographed.

Figure 2:
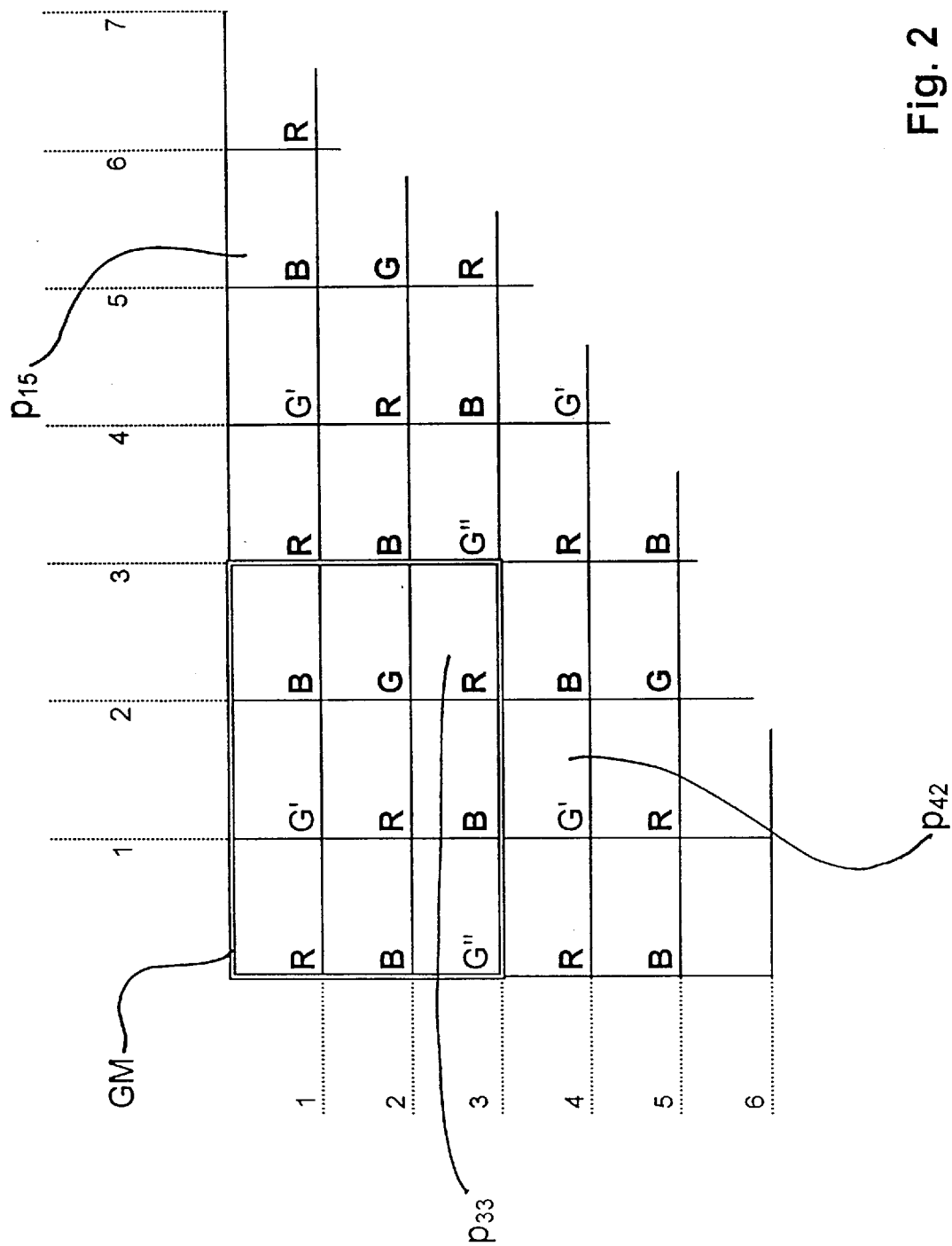
FIG. 2 shows a top view of a part of the CCD image sensor in which the distribution of the filter elements on the surface of the CCD image sensor can be seen.

In the preferred embodiment of the system according to the present invention, five different filter elements are distributed in a specific pattern on CCD image sensor 2 (see FIG. 2).

In a preferred embodiment, for example, a system is employed comprising of five filter elements whose maximum spectral transparency has the following wavelengths (Table 1):

TABLE 1

B = 445 nm
G' = 494 nm
G = 545 nm
G" = 570 nm
R = 595 nm,

The spectral transparency of the individual filter elements B, G', G, G" and R being chosen in such a way that it is possible to achieve the most uniform possible overlapping of the individual wavelength regions. The wavelengths in boldface characters denote a sensor system equivalent to that of the human eye. The wavelengths in between are termed G' (for 495 nm) and G" (for 570 nm).

The individual filter elements are arranged on CCD image sensor 2 in a repetitive pattern (see FIG. 2). This repetitive pattern is used on the entire surface of CCD image sensor 2 (see Table 2).

TABLE 2

| R  | G' | B |
| B  | R  | G |
| G" | B  | R |

Figure 3:
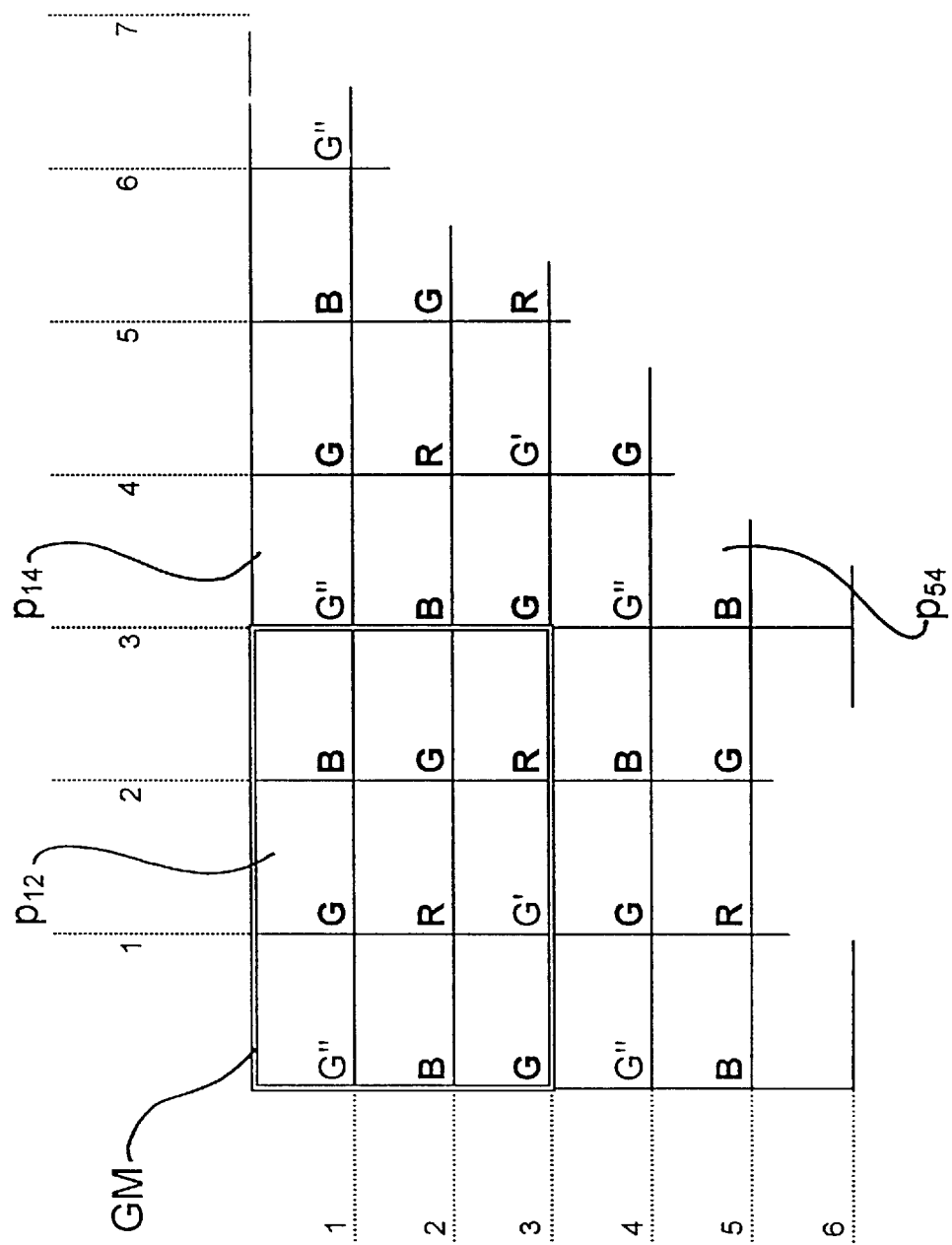
FIG. 3 depicts a top view of a part of the CCD image sensor for which a different distribution of the filter elements on the surface of the CCD image sensor has been chosen.

FIG. 2 shows the arrangement of the individual filter elements on the individual pixels $p_{11}$, $p_{12}$, ... $p_{ij}$ of CCD image sensor 2, i representing the number of rows and j the number of columns. Only part of CCD image sensor 2 is shown here since the pattern given in Table 2 is continued over the entire CCD image sensor 2. Thus, for example, pixel $p_{11}$ of the first row and the first column is covered by filter element R, pixel $p_{12}$ of the first row and the second column by filter element G', pixel $p_{13}$ of the first row and the third column by filter element B, pixel $p_{21}$ of the second row and the first column by filter element B, pixel $p_{22}$ of the second row and the second column by filter element R, pixel $p_{23}$ of the second row and the third column by filter element G, pixel $p_{31}$ of the third row and the first column by filter element G", pixel $p_{32}$ of the third row and the second column by filter element B and pixel $p_{33}$ of the third row and the third column by filter element R. This basic pattern GM (Table 2) is continued over the entire CCD image sensor 2: this is best illustrated in FIG. 2. Another possible form of basic pattern GM can be seen in Table 3. FIG. 3 explicitly shows the arrangement of the individual filter elements with respect to the individual pixels $p_{12}$ ... $p_{ij}$ of CCD image sensor 2.

TABLE 3

| G" | G  | B |
| B  | R  | G |
| G  | G' | R |

The basic pattern GM as illustrated in FIG. 2 and FIG. 3 are embodiments of multispectral mosaic filters. In addition, it is likewise possible to design multispectral mosaic filters which contain IR-sensitive, or even UV-sensitive, filter elements. It is expedient in this instance to take the entire spectral range for which the "naked" CCD image sensor 2 is sensitive, to break it up into transmission bands while ensuring the greatest possible uniformity and to provide each band with a mosaic type of filter. Such a multispectral mosaic filter camera acts as an imaging spectrometer with high spatial resolution and moderate spectral resolution.

As shown in FIG. 1, the system has a digital image memory 6 with random access (RAM). The image memory 6 has image memory levels $B_0$, $B_1$ to $B_{nF}$ which correspond to the number nF of the different filter elements used in basic pattern GM. The number of image memory levels $B_0$, $B_1$ to $B_{nF}$ is greater by one than the number of different filter elements used to build up the basic pattern GM. In the embodiment described here, exposure of CCD image sensor 2 is performed and its pixel values directly transmitted to the first level $B_0$: access to the pixel values wert[i][j][0] can be made for each pixel $p_{ij}$. This provides the starting point for the above-mentioned process. In the course of the process, additional nF image memory levels $B_1$, $B_2$ to $B_{nF}$ are available for the storage of data wert[i][j][f], so-called "color-values". As mentioned above, nF represents the number of different filter elements. In the embodiments described according to the present invention, the number of different filter elements amounts to five. After completion of the process, the image memory levels $B_1$, $B_2$ to $B_{nF}$ have a "full picture". In addition, the system has a processor 8 which reads data from image memory 6 into its own register (not shown) in order to perform calculations with the contents of its own register and to write the results into image memory 6.

Figure 4A:
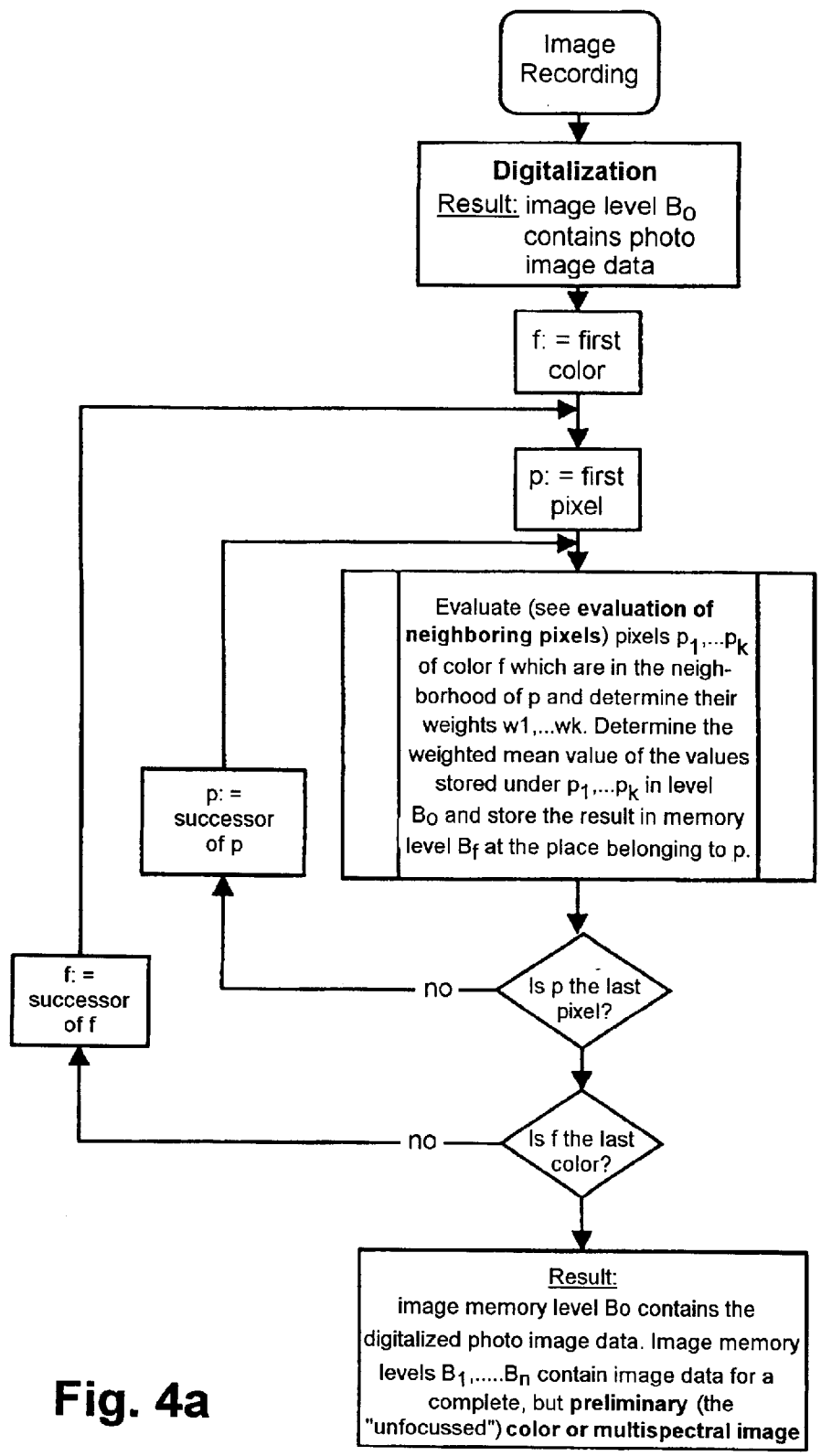
FIGS. 4a and 4b show a flow diagram of the process.
Figure 4B:
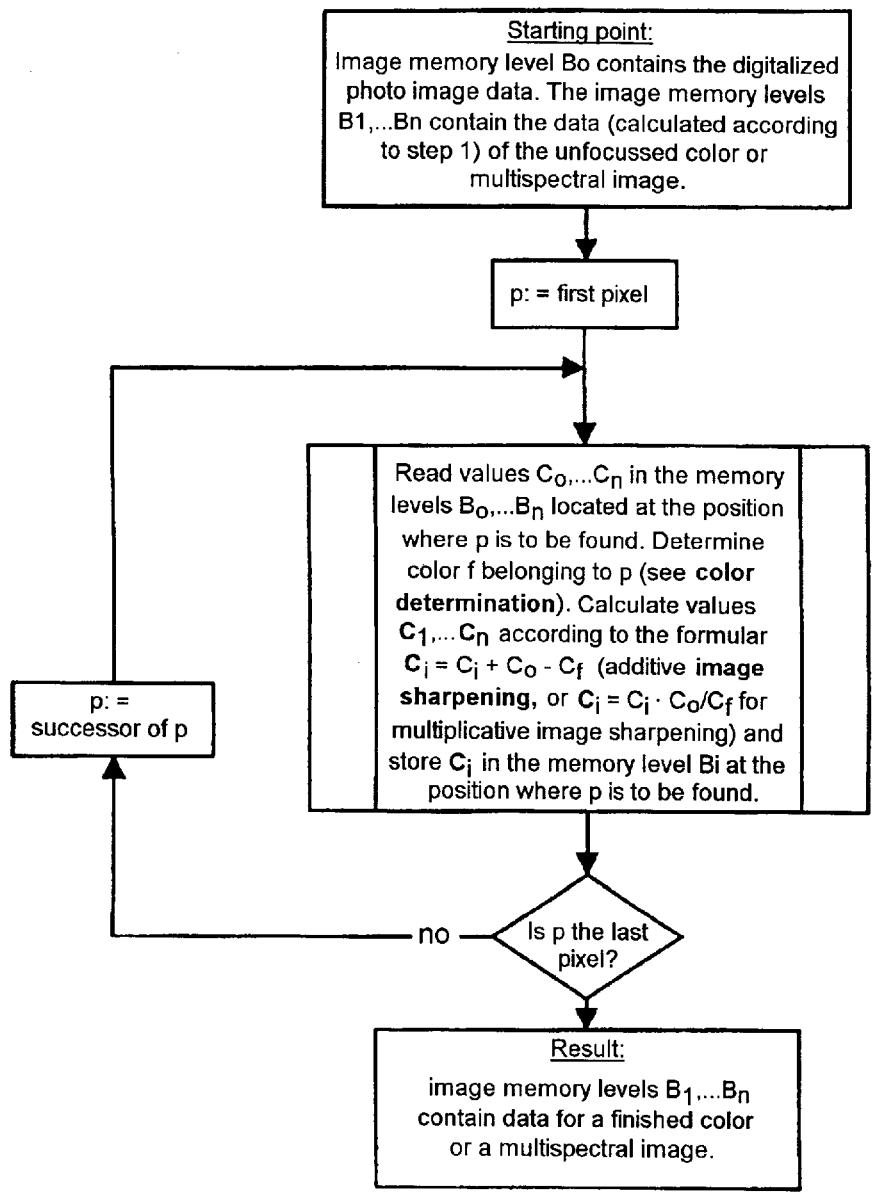

FIG. 4a and FIG. 4b show a flow diagram of the process according to the present invention. A scene or image is photographed by means of the CCD image sensor 2. In the following step, the values measured by the individual pixels $p_{ij}$ of the CCD image sensor 2 are converted by the analog/digital converter 5 into digital data values wert[i][j][0]. These data are stored for further use in image memory level $B_0$. In order to obtain a full color image, all pixels $p_{11}$, $p_{12}$ to $p_{1m}$ have to be assigned digital values for each of the nF filter colors. This step is performed using a double loop. The outer loop runs via colors f and the inner loop via pixels $p_{ij}$ of the CCD image sensor 2 (see FIG. 4a). Those pixels of the CCD image sensor 2 which are provided with the filter elements of color f and which are to be found in the neighborhood of $p_{ij}$ are determined. This is done by performing an evaluation of the neighboring pixels as well be explained in detail below. In addition, the nearest neighbors are given a weighting factor which will depend on the distance to starting pixel $p_{ij}$. These data provide the basis for calculating the values wert [i][j][f] as weighted mean values. Values wert[i][j][f] are then stored for further use in the dedicated image memory levels $B_1$, $B_2$ to $B_{nF}$. As already mentioned, determination of color, determination of the nearest neighbors and determination of the color values of all pixels are steps which are carried out for all different filter elements on CCD image sensor 2. Using a suitable process (described below), the final color values are determined and likewise stored for further processing in a suitable memory.

As already mentioned, it should be noted that, in order 1 ate the full image, all color values $C_1$=wert [i][j][1], $C_2$=wert [i][j][2] to $C_{nF}$=wert[i][j][f] of each individual pixel $p_{ij}$ on the CCD image sensor 2 have to be determined for each filter color used. It can be seen from the preferred embodiments shown in FIG. 2 and FIG. 3, that when making an exposure, not all pixels of the CCD image sensor 2 provide a signal for each of the filter colors used; hence, the color values missing for certain pixels have to be determined. The mosaic filter illustrated in FIG. 2 is taken as an example. Processor 8 reads those pixels from the image memory level $B_0$ which have a value, for example, for the color value R. The values for those pixels without a measured value then have to be calculated. According to FIG. 2, a value for color value R is available for pixels $p_{11}$, $p_{22}$, $p_{33}$, $p_{14}$, $p_{25}$, $p_{36}$, $p_{17}$, ... $p_{41}$, $p_{52}$, $p_{63}$, $p_{44}$, $p_{55}$ etc. Employing a suitable process, color value wert[i][j][R] must be calculated for the missing pixels $p_{12}$, $p_{13}$, $p_{15}$, $p_{16}$ ... $p_{21}$, $p_{23}$, $p_{24}$, $p_{26}$ ... $p_{31}$, $p_{32}$, $p_{34}$, $p_{35}$ ... $p_{42}$, $p_{43}$, $p_{45}$ etc. The calculation of the values of the other filter colors G, G', G" and B is carried out accordingly.

Processor 8 proceeds as follows to calculate the color values wert [i][j][f] for each pixel $p_{ij}$, wherein i=1, ... 1; j=1, ..., m and f=1, ... ,nF.

In a first step the following calculations are made for each color f (numbered 1,2, ... nF) and for each pixel $p_{ij}$.

Loading all pixel values wert[i][j][0] by using "evaluation of neighboring pixels" (see description below) wherein the pixels belong to color f and whose pixels $p_{ij}$ are nearest to pixels $p_{ij}$, and load them together with their weighting factors from the image memory level $B_0$. (See description of the evaluation of neighboring pixels).

Calculating the weighted mean of these data with regard to the aforementioned weighting factors $W_{ij'j'}$.

Storing of the weighted mean as color value wert[i][j][f] in the image memory level $B_1$, $B_2$, ... $B_{nF}$ belonging to color f.

In this way a full, but nevertheless intermediate image is obtained and one which is termed here as being an "unfocussed image". The intention in the construction of this image is as follows: the picture should be free of fine details and its color should be reliable in regions in which the color undergoes no rapid change. In order to ensure the absence of fine details, the evaluation of neighboring pixels must be performed in such a way that it never defines only one pixel as being the nearest neighbor. Only in this instance is it possible for the process to generate weighted mean values which are not local and which produce the desired reduction in sharpness. It has been shown that a mean value over four or five points is ideal. If computing effort and computing time do not pose a problem, it is possible to make the "unfocussed picture" more homogeneous by a smoothing filter operation.

Thereafter, processor 8 calculates the final image according to a process for which two alternative embodiments are given here:

first, loading of the following values for each pixel $p_{ij}$ is performed:

S=wert[i][j][0] from image memory 6 and there from image memory level $B_0$;

$C_1$=wert[i][j][1] from image memory level $B_1$;

$C_2$=wert[i][j][2] from image memory level $B_2$ and $C_{nF}$=wert[i][j][nF] from image memory level $B_{nF}$.

Determine color f of pixel $p_{ij}$ according to the method of color evaluation as described in detail in the following.

The final color values $C_1$, $C_2$, ... $C_{nF}$ are calculated according to the formula (additive image sharpening)

$$C_k = C_k + S - C_f \text{ for } k=1, \ldots nF$$

or the formula (multiplicative image sharpening)

$$C_k = \frac{SC_k}{C_f} \text{ for } k = 1, \ldots nF.$$

If the result falls below the lowest meaningful digital signal value (as a rule 0), or exceeds the highest meaningful digital signal value (frequently 255), then these limitations are defined as representing the result. In this instance it is preferable to reduce the additive correction value $S-C_f$ or the multiplicative correction value $S/C_f$ to a value which will prevent exceeding these limits.

The final color values $C_1$, $C_2$, ... $C_{nF}$ are stored in the memory levels $B_1$, $B_2$, ... $B_{nF}$. They are:

wert[i][j][1]=$C_1$, wert[1][j][2]=$C_2$...

wert[i][j][nF]=$C_{nF}$

With this process it is possible to produce a barely noticeable change (using the additive method) or no change at all (using the multiplicative method) in the color of the unfocussed picture and to use the actual signal value S to effect luminance adaptation. In the case of the additive method this is achieved by adding white or black, in other words by means of color desaturation. In this way, any color edge artifacts become less noticeable: for this reason, the additive method is generally preferred. In addition, it is simpler to calculate.

It is to be expected that the process will show little tendency toward color edge artifacts: firstly, because the color is calculated by averaging all values, and secondly, because the color is desaturated following each addition of light. Since the brightness can be adjusted for each pixel without averaging, good fidelity to detail is also to be expected. Experiments have confirmed both expectations.

On the other hand, an artifact is present which is unknown in other processes. Along lines where heavily colored areas meet, a colorless pattern is generated which is caused by the geometry of parts of the mosaic filter. It is generally not very noticeable.

The following gives a detailed explanation regarding color determination and evaluation of neighboring pixels for the preferred embodiments of the invention.

Color determination: (determination of the color of the individual pixels $p_{ij}$ of the CCD image sensor)

In the case of a periodic mosaic filter (basic pattern GM), as illustrated in FIG. 2 or FIG. 3, the entire mosaic filter on the CCD image sensor 2 is built up by periodic repetition of basic pattern GM. The column number of the basic pattern is termed nVert and the row number mHor. Thus, nVert=mHor=3 is valid for the pentaspectral pattern proposed in accordance with the present invention. The distribution of the colors on the nver, mHor positions of basic pattern GM takes the form of a numerical (nVert, MHor) matrix. Basic pattern GM, for example, has the form shown in Table 3 in the case of the pentaspectral mosaic filter (for the sake of clarification the filter elements were arranged as indicated in FIG. 3):

TABLE 3

| 4 | 3 | 1 |
|---|---|---|
| 1 | 5 | 3 |
| 3 | 2 | 5 |

The numbers in the matrix are assigned as follows to the individual colors of the filter elements of the basic pattern: B≈1, G'≈2, G≈3, G"≈4 and R≈5.

On the basis of the matrix shown in Table 3, that pixel $p_{ij}$ is determined which has a specific color $f=C_{ij}$. Color f of pixel $p_{ij}$ is calculated by means of the following equations in which i is the vertical and j is the horizontal position of an arbitrary element of the CD image sensor and in which the row-wise and column-wise position of the pixel on the basic pattern GM is represented by $i_{lokal}$ and $i_{lokal}$ respectively.

$i_{lokal}$=1+remainder of the division (i−1)/nVert $j_{lokal}$=1+remainder of the division (j−1)/nHor $C_{ij}$=GM [$i_{lokal}$] [$i_{lokal}$]

In a pseudo-random mosaic filter, color $C_{ij}$ of pixel $p_{ij}$ is determined for a given i and j as follows:

r:=50000·sin (i)+30000·sin (j)

z1=biggest integer, smaller or equal to r.

r1=r−z1, this number yields 0<r1<1.

In order to illustrate the significance of this expression, we consider y: 5·sin (i)+3·sin (j) as a decimal fraction and assume, for the sake of simplicity, that y is positive:

y=d1, d2 3 d4 d5 d6 d7 d8

The number r1 can then be developed into a decimal fraction 0, d6 d7 d8 r1 is defined by the "higher digits" of y; it is evident that they depend on i and j pseudo-randomly. In a last step, r1 is adjusted to the desired value range (1, . . . nF). (nF is the number of the different colors):

r2=nF·r1 z2=biggest integer, smaller or equal to r2

$C_{ij}$=1+r2−z2.

This is only one of many procedures which are based on the fact that the higher decimal digital of transcendental functions depend pseudo-randomly on the argument of the function, if it varies in big steps compared to the order to magnitude which is given by the decimal digit in question. In particular, the constants 50000 and 30000 can be replaced by other numbers of a similar order of magnitude, and it is possible to replace sin ( ) by cos ( ). This purely random distribution of colors has the tendency to generate clusters, that is pixel regions often occur in which one color is far more frequently represented than in the case of even distribution. There are likewise surprisingly large areas in which one color is completely missing. By varying the process, as can be done in processes for "digital half-toning", care can be taken that the color distribution is more uniform, but without giving rise to locally constant patterns, such as those which are present in periodic mosaic patterns. An obvious method is to take optimizing experiments as a basis and to develop such "uniformized random distribution" of the pixel colors over a relatively large field of about 64·64 pixels and then to perform periodic repetition of the pseudo-random pattern. As a result, the advantages of periodic patterns, i.e. the simpler neighbor algorithm, are also effective in this case.

The evaluation of the neighboring pixels (determination of the number of pixels $p_{ij}$ located closest to a particular pixel which have the same color as the first pixel).

As not all pixels $p_{ij}$ of the CCD image sensor 2 supply the information of a simple color, the missing pixels $p_{ij}$ have to be calculated in order to obtain a color image. The process proposed for making these calculations contains several parameters to be evaluated which can be freely chosen within certain limits. First of all, the distance between the pixels is defined. The distance d of pixel $p_{i1j1}$ to pixel $p_{i2j2}$ is defined as follows:

$$d(i1,j1;i2,j2):=|i1-i2|+|j1-j2|$$

or, the geometrical distance between the pixel $P_{i1j1}$ and pixel $P_{i2j2}$, the latter, however, being less suitable for fast computing.

In addition, for each pixel $p_{ij}$ a calculation has to be made to determine the maximum area $U(p_{ij})$ to be taken into consideration; this fixes an upper limit for the number of "neighboring pixels" and defines the number of computing steps required to select these neighboring pixels. This is performed by establishing a number $d_{Max}$ with which it is possible to calculate the area $U(p_{ij})$ in question.

$$U(p_{ij})=\{p_{i'j'}||i-i'|\leq d_{Max}; |j-j'|\leq d_{Max}; C_{ij}=f\}$$

For the color occurring the least frequently, the set should also have at least 2 and preferably 4 to 6 elements. This can be achieved by selecting a sufficiently large value of $d_{Max}$. This means, however, that for the color occurring the most frequently, the set $U(p_{ij};f)$ can contain more pixels than are required. In order to take this into consideration, the pixels are arranged according to their distance (see above) from the reference pixel $p_{ij}$ and those furthest away are discarded.

The following procedure is applied: two pixels from this set are defined as being equivalent when they have the same distance from reference pixel $p_{ij}$. In this way, $U(p_{ij};f)$ is divided into equivalence classes. Arranged according to their increasing distance, these equivalence classes are denoted as follows:

$U_1(p_{ij};f); U_2(p_{ij};f); \ldots ; U_k(p_{ij};f)$ and the number of their elements are denoted by $u_1(p_{ij};f), u_2(p_{ij};f), \ldots u_k(p_{ij};f)$.

The above-mentioned possibility of discarding some of these elements is made reality by selecting a natural number k0 with $1 \leq k0 \leq k$ such that $$2 \leq \sum_{p=1}^{k0} U_p(p_{ij};f) \approx 5$$

According to the definition $$NU(p_{ij};f) = U_1(p_{ij};f) \cup U_2(p_{ij};f) \cup \ldots \cup U_{k0}(p_{ij};f)$$

then yields pixels $p_{ij}$ of color f which are in the area closest to pixel $p_{ij}$. The weight of pixels $p_{ij}$ now has to be evaluated. One possibility is that this weight solely depends on the distance to the reference pixel; thus, all pixels of the same equivalence class have the same weight. This is done by choosing a list ω of k0 positive numbers for which the following is valid:

$$\omega(k0) \leq \ldots \leq \omega(1)$$

$$\sum_{p=1}^{k0} \omega(p) = 1$$

Hence the weight of a pixel $P_{ij} \in NU(p_{ij};f)$ is given by $$w(p_{ij};f) := \omega(p)/U_p(p_{ij};f)$$

where the index p is chosen so that $$(p_{ij}) = U_p(p_{ij};f)$$

Thus, the weighted mean value required in the first step of the process is defined as $$wert[i][j][f] = \sum_{(p_{i'j'}) \in NU(p_{ij};f)} w(p_{i'j'};f). \quad (B1)$$

$$wert[i'][j'][0]$$

In this way, the evaluation of the neighboring pixels can be performed each time a color is determined. However, the formation of equivalence classes is very computer intensive. In the case of a periodic pattern, computer time can be significantly reduced by making preliminary calculations and storing them. In equation (B1) i and j outside the square brackets can be replaced by $i_{lokal}$ and $j_{lokal}$, defined in the earlier description of the color evaluation, and i', j' by i+s, j+t where (s,t) is restricted by corresponding conditions like (i',j'):

$$wert[i][j][f] = \sum_{(p_{i'j'}) \in NU(p_{ilokal}, j_{lokal};f)} w(p_{ilokal\, jlokal};f).$$

$$wert[i + s][j + t][0]$$

with $NU_{rel}(p_{ij};f) := \{(s,t)|(i+s,j+t) \in NU(i,j;f)\}$
With this, for the nVert·nHor·nF values $(i_{lokal}, j_{lokal};f)$, the lists $$NU_{reL}(p_{ilokal\, jlokal};f) = ((s1,t1),(s2, t2) \ldots) \text{ and}$$

$$w(p_{ilokal\, jlokal};f) = (w_1, w_2, \ldots)$$

have to be calculated, whose length is typically (see above) only 4 to 6. These lists are calculated once as part of the software development of the system and stored in a ROM. When this process takes place in a camera with the actual values $(p_{ij};f)$ being dependent on $(p_{ilokal,\, jlokal};f)$, the relevant lists are loaded and the weighted mean value simply calculated as:

$$wert[i][j][f] = w1 \cdot wert[i+s1][j+t1][0] + w2 \cdot wert[i+s2][j+t2][0] + \ldots$$

The present invention has been described with reference to a preferred embodiment; however, it is obvious that an expert in the field may make modifications in accordance with his capabilities without exceeding the scope of protection of the following claims.

I claim:

1. Process for generating color images and/or multispectral images in which an optical arrangement (3) images a scene on a CCD image sensor (2), said sensor being covered by a mosaic filter with a periodic basic pattern (GM), characterized in that the basic pattern (GM) consists of five different color filter elements and in that the process comprises the following steps:
   storing values (wert[1][j][0]) of each individual pixel ($p_{ij}$) of the CCD image sensor (2) in a dedicated level $B_0$ of an image memory (6), said values being measured by the CCD image sensor (2) and being transformed by a following analog/digital converter (5) into digital values;
   determining an "unfocussed image" by calculating a neighboring pixel of color f for each color f and for each pixel p, reading their values from $B_0$ and combining them to arrive at a weighted average value;
   storing values (wert[i][j][f]) for all the different filter elements on the CCD image sensor (2) in dedicated image memory levels ($B_1, B_2, \ldots, B_{nF}$);
   calculating of final color values ($C_1, C_2, \ldots, C_{nF}$) by means of additive image sharpening; and
   storing the final color values ($C_1, C_2, \ldots, C_{nF}$) in dedicated image memory levels ($B_1, B_2, \ldots, B_{nF}$).

2. Process according to claim 1, characterized in that the final color values ($C_1, C_2, \ldots, C_{nF}$) are calculated by multiplicative image sharpening.

3. Process according to claim 1, characterized in that illumination prevailing when photographing a scene can be transformed into an illumination of a different spectral composition.

4. Process according to claim 3, characterized in that when photographing a scene, a white reference body with known spectral reflection properties is added to the scene to be photographed.

5. Process according to claim 3, characterized in that a data memory of processor (8) stores the data for different illuminations, said data being transferable from the memory according to a chosen illumination, or characterized in that the processor (8) uses data obtained from an illuminated reference body to calculate the data necessary to make a change to a different spectral illumination and stores them in the memory of processor (8).

6. Process according to claim 1, characterized in that the basic pattern (GM) used in the mosaic consists of a pentaspectral pattern.

7. Process according to claim 6, characterized in that a distance from a starting pixel is defined in such a way that in an area defined by a chosen distance there are at least two pixels with the least frequently occurring color f of a filter element.

8. Process according to claim 7, characterized in that in the neighborhood of the starting pixel there are four to six pixels with the least frequently occurring filter color.

9. Process according to claim 6, characterized in that the pixels at equal distance from a starting pixel are assigned to an equivalence class and in that these pixels have a same weighting factor w.

10. Process according to claim 9, characterized in that equivalence classes and the weighting factors for the periodic basic pattern (GM) are stored in the memory of processor (8) in order to reduce a time to produce a final color image.

11. System for generating color images and/or multispectral images by means of an optical arrangement (3) which images a scene on a CCD image sensor (2), said CCD image sensor (2) being covered by a mosaic filter with a periodic basic pattern (GM) and connected to a following analog/digital converter (5) which produces digital signals from all pixels $p_{ij}$ of the CCD image sensor (2), characterized in that the basic pattern (GM) is built up of at least five different filter elements, and a digital image memory (6) with random access is provided, said memory having a number of image memory levels ($B_1, B_2, \ldots B_{nF}$) which corresponds equally to the number of different filter elements of the basic pattern (GM) and having in addition an image memory level $B_0$ which stores the digital signals of all pixels $p_{ij}$ of the CCD image sensor (2), said digital signals being generated by the analog/digital converter (5).

12. System according to claim 11, characterized in that a processor (8) is used to control the system, organization and access of a digital image memory (6) and to evaluate digital image data.

13. System according to claim 11, characterized in that the basic pattern (GM) is a pentaspectral pattern.

14. System according to claim 11, characterized in that each individual level of image memory levels (B1, B2, ... $B_{nF}$) stores only data of a specific color value wert[i][j][f], and in that color values wert[i][j][f] consist of the digital data of the color values of pixels $p_{ij}$ of the CCD image sensor (2), said pixels $p_{ij}$ being provided with filter elements of the specific color f, and in that the digital values for pixels $p_{ij}$ of the CCD image sensor (2) which are not provided with the filter element of the specific color f can be evaluated with the help of the processor (8).

15. System according to claim 14, characterized in that a distance from a starting pixel is defined in such a way that in an area defined by a chosen distance there are at least two pixels of the least frequently occurring color of a filter element.

16. System according to claim 15, characterized in that in the neighborhood of the starting pixel there are four to six pixels with the least frequently occurring filter color.

17. System according to claim 16, characterized in that those pixels equidistant from the starting pixel are assigned to an equivalence class and in that these pixels have a constant weighting factor.

18. System according to claim 17, characterized in that in the case of a periodic basic pattern (GM) the equivalence classes and the weighting factors are stored in the memory of processor (8).

19. System for generating color images and/or multispectral images by means of an optical arrangement (3) which images a scene on a CCD image sensor (2), said CCD image sensor (2) being covered by a mosaic filter with a periodic basic pattern (GM) and connected to a following analog/digital converter (5) which produces digital signals from all pixels pij of the CCD image sensor (2), characterized in that the basic pattern (GM) is built up of at least five different filter elements, and a pentaspectral pattern is built up of three pixel rows and three pixel columns and in that pixels $p_{11}$, $p_{22}$ and $p_{33}$ are provided with a red filter element R, pixels $p_{13}$, $p_{21}$ and $p_{32}$ with a blue filter element B, pixel $p_{23}$ with a green filter element G, pixel $p_{12}$ with a green filter element G' and pixel $p_{31}$ with a green filter element G", the maximum spectral transparency of G' being less than the maximum spectral transparency of G".

20. System according to claim 19, characterized in that the maximum spectral transparency of red filter element R is 595 nm, the maximum spectral transparency of blue filter element B is 445 nm, the maximum spectral transparency of green filter element G is 545 nm, the maximum spectral transparency of green filter element G' is 494 nm and the maximum spectral transparency of green filter element G" is 570 nm.

21. System for generating color images and/or multispectral images by means of an optical arrangement (3) which images a scene on a CCD image sensor (2), said CCD image sensor (2) being covered by a mosaic filter with a periodic basic pattern (GM) and connected to a following analog/digital converter (5) which produces digital signals from all pixels pij of the CCD image sensor (2), characterized in that the basic pattern (GM) is built up of at least five different filter elements, and a pentaspectral Bayer pattern is built up of three pixel rows and three pixel columns, and in that pixels $p_{22}$ and $p_{33}$ are provided with a red filter element R, pixels $p_{21}$ and $p_{13}$ with a blue filter element B, pixels $p_{12}$ and $p_{23}$ with a green filter element G, pixel $p_{32}$ with a green filter element G' and pixel $p_{11}$ with a green filter element G", the maximum spectral transparency of G' being less than the maximum spectral transparency of G".

* * * * *